Sept. 23, 1941.  F. L. JOHNSTON  2,256,483
SYNTHETIC SPONGY MATERIAL
Filed June 21, 1939
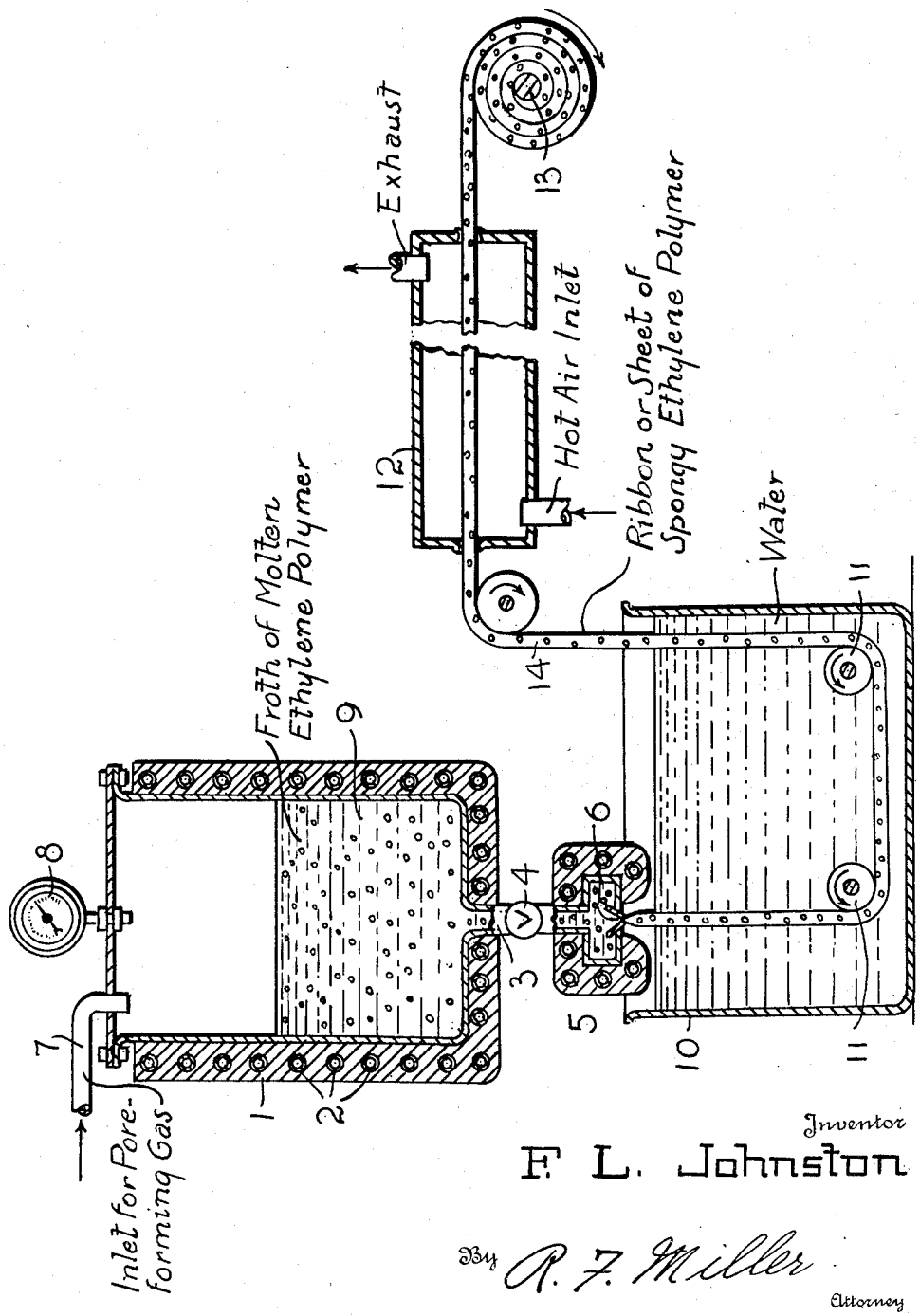
Inventor
F. L. Johnston
By R. F. Miller
Attorney Patented Sept. 23, 1941

2,256,483

UNITED STATES PATENT OFFICE 2,256,483

SYNTHETIC SPONGY MATERIAL

Frederick L. Johnston, Claymont, Del., assignor to E. I. du Pont de Nemours & Company, Wilmington, Del., a corporation of Delaware Application June 21, 1939, Serial No. 280,421

3 Claims. (Cl. 260—94)

This invention relates to new products and articles of manufacture, and more particularly to synthetic spongy materials.

The spongy articles most commonly manufactured are those made from rubber and cellulosic materials. In general these articles are prepared for uses analogous to those of natural sponge. Materials capable of being formed into useful porous or spongy articles are relatively few, and in many instances the physical properties of the spongy products heretofore proposed have prevented their application to fields where the use of spongy material of the required properties would be desirable. One example of such defects is more or less rapid deterioration, rubber from oxidation and cellulosic materials from moisture absorption.

This invention has as an object the manufacture of synthetic porous or spongy products of valuable properties having a wide utility in the arts. A further object is the preparation of a thermal insulating material which will remain unchanged in form and unimpaired in properties over long periods of time. A still further object is to prepare an article which combines the properties of resilience and long life with form stability and excellent heat and sound insulating capacity. Other objects will appear hereinafter.

These objects are accomplished, as described hereinafter in more detail, by forming the above mentioned spongy products from solid polymers of ethylene.

The ethylene polymers used in the practice of this invention are those obtained by the process described in Patent No. 2,153,553, and in application Serial No. 157,810, filed August 6, 1937, by Perrin, Paton and Williams. The process described in the patent consists in subjecting ethylene to pressures in excess of 500 atmospheres under controlled elevated temperature conditions. This procedure results in various polymers of ethylene, the molecular weight of which varies depending particularly upon the pressure and temperature conditions employed. By using pressures of more than 1000 atmospheres and temperatures of the order of about 200° C., solid polymers of ethylene can be formed.

Under these conditions the polymerization reaction takes place smoothly, requiring several hours for completion. Or the more rapid reaction described in the above mentioned application may be used. In this method a definite but small quantity of oxygen, which may be as little as 0.01% but preferably 0.03% to 0.10% at 1500 atmospheres, is included in the ethylene treated. The pressures are at least 500 atmospheres and preferably at least 1000 atmospheres and below 3000 atmospheres. The temperatures are between 100° C. and 400° C. and more desirably from 150° C. to 250° C. Thus, as a specific instance of obtaining the ethylene polymer, ethylene containing 0.5% oxygen is compressed in a steel bomb to a total pressure of 1500 atmospheres and heated rapidly at 210° C. whereupon a very rapid change in pressure followed by a slow drop in pressure is observed. After five hours' heating at 210° C. the pressure is released and the product cooled. Under these conditions an 80% yield of the solid polymer, based on the ethylene used, is obtained. These solid ethylene polymers obtained as outlined above melt or soften above about 100° C., usually between about 110° C. and about 200° C. depending upon the molecular weight of the particular polymer, have a molecular weight in excess of 4000, and are essentially saturated products corresponding in composition substantially to $(CH_2)_x$. They are soluble in xylene at its boiling point and are unaffected by prolonged contact with air at ordinary temperatures. These solid polymers as ordinarily prepared show a crystalline structure when subjected to X-ray diffraction analysis. It is to be understood that the ethylene polymers referred to herein mean the above identified polymers.

The molecular weights mentioned herein were obtained by the method for determining the molecular weights of polymers of high molecular weight devised by H. Staudinger (see Ber. 67B, 1247 et seq. (1934)), this method being based upon the measurement of the viscosity of a solution of the polymer in a solvent (tetrahydronaphthalene). As this method may not be susceptible of a high degree of accuracy, the values given in this specification should be in all cases regarded as approximate.

The melting or softening points were measured by a "ball and ring" procedure in which a film of the polymer, supported over a ring, is treated by immersion in a heated non-solvent and a steel ball is placed over the film. The melting or softening point is taken as the temperature at which the polymer is sufficiently soft to permit the ball to pass through the ring.

A convenient method of making the porous products of this invention consists in incorporating a gas in the molten ethylene polymer and cooling the resulting froth to a resilient, porous solid. In the preferred method the gas is allowed to expand in the molten polymer, this procedure being carried out by a reduction in pressure during an extrusion process. By varying the shape of the extrusion nozzle the froth is shaped into any desired form prior to cooling. Within limits the form stability and resilience of the product are controlled by varying the size of the gas bubbles prior to cooling the froth.

The products of this invention possess properties of excellent thermal and sound insulating capacity and resilience to a degree not at all to be expected from the nature of the original polymer, as well as an inertness to moisture and mold.

The single figure of the drawing illustrates diagrammatically a form of apparatus suitable for carrying out my invention.

The following examples are illustrative of methods that may be used in practicing my invention.

*Example I*

Ethylene polymer of average molecular weight about 25,000 is ground to pass a 10-mesh screen. This granular material is charged into a steel pressure chamber 1, fitted with electrical resistance coils 2 for external heating. At the bottom of this chamber a short tube 3 fitted with a valve 4 leads to a heated extrusion box 5 with a slit opening 6 of variable width, set temporarily at 1/16". With the valve closed, nitrogen gas is pumped into the charged chamber through the inlet 7 until the pressure is 300 lbs./sq. in. as indicated by the gauge 8. This pressure is maintained and the chamber heated until the polymer melts, a temperature of 120° C. being required in this instance. The granular form of the original charge and the extremely high viscosity of molten polymer (7,000–10,000 poises) causes a large number of nitrogen bubbles to be entrapped in the molten polymer which forms a froth of molten polymer 9. There is substantially no tendency for this froth to collapse even on long standing due to its high melt viscosity. The valve 4 is then opened and the froth extruded out through the slit 6 directly into cold water in the tank 10. The passage of the froth through the valve and extrusion chamber causes the nitrogen bubbles to be comminuted. On the release of pressure from 300 lbs./sq. in. to room pressure at the point of extrusion, the bubbles of the froth undergo expansion which increases the volume of the froth. The cold water serves to solidify the sheet of froth by cooling it as it extrudes from the slit, thereby preserving the expanded form of the froth. The resulting spongy sheeting is produced in the form of a continuous strip 14 0.25" thick. This strip is drawn over rollers 11 in the water bath and out through a drying oven 12 onto a suitable windup 13.

This spongy material has an apparent density of 0.288 as compared to 0.94 for the original polymer, and the average diameter of the pores produced by the nitrogen is 0.01". This sheeting is flexible and resilient. In spongy product prepared from a froth as above each pore in the final spongy mass is a discrete gas-containing cell with no opening into adjoining cells, and the surface of the sheet, except where cut, is a continuous film of the ethylene polymer. The thickness of this outer surface film may be increased by momentarily heating it above the melting point to collapse the pores adjacent to the surface. It may also be increased by coating with additional polymer from a melt, from hot solution in a suitable solvent or by laminating a preformed sheet of ethylene polymer.

Spongy ethylene polymer sheeting of the above type possesses excellent thermal insulating capacity, is resilient but will not sag under its own weight, and is unaffected by moisture, heat up to 100° C., mold, fungus growth, nor is it subject to attack by vermin, termites, etc.

*Example II*

Powdered ethylene polymer of average molecular weight about 17,000 is mixed with powdered ammonium carbonate. Both are screened to pass a 100-mesh sieve and are thoroughly mixed in proportions of 4 parts by weight of the polymer to 1 part by weight of carbonate. This mixed powder is then compressed slightly in a stainless steel cylinder by means of a close fitting piston. Heat is applied until the charge in the cylinder is raised to a temperature of 120° C. The ethylene polymer then melts and the ammonium carbonate decomposes into $NH_3$, $CO_2$, and $H_2O$. The gases resulting from this decomposition appear as bubbles in the molten polymer and within 2 to 4 minutes are under considerable pressure due to the high rate of decomposition of ammonium carbonate at this temperature. When the pressure has reached 3,000 lbs./sq. in. the piston is allowed to rise until the volume occupied by the ethylene polymer-carbonate mixture is increased to six times the original. The pressure decreases only slightly during this expansion due to continued decomposition of the ammonium carbonate. The cylinder is then cooled to solidify the polymer in expanded spongy form. The pores in this material tend to be elongated cells, due to the expansion in only one direction. The average diameter of these cells is about 1.8 mm. and the apparent density of this material is 0.088. When compressed at ordinary temperature at a pressure of about 90 lbs./sq. in. this spongy material decreases to 19% of its original volume and recovers to 95% of its original volume immediately on release of pressure, the remaining 5% being recovered within 1 to 2 minutes. A sample of solid ethylene polymer of similar size and density of 0.94 shows no measurable compression at room temperature even under a pressure of 10,000 lbs./sq. in.

A block of the spongy material prepared as above is trimmed to a suitable shape and fitted with a fabric cover to produce a seat cushion of excellent resilience and durability.

Spongy ethylene polymer prepared as above, except that the expansion is allowed to go only to three times the original volume before cooling, is similar in properties, has an apparent density of 0.30, has an average pore size of 0.87 mm., compresses to 43.5% original volume under a pressure of about 90 lbs./sq. in., and recovers to 100% its original volume immediately on release of pressure.

*Example III*

Powdered ethylene polymer of average molecular weight about 22,000 is screened to pass a 60-mesh screen. Granular sodium chloride is ground to a similar size and the two are thoroughly mixed in proportions of 1 part of the polymer to 3 parts of salt. This mixture is charged into a mold and heated at 150° C. under a pressure of 2,000 lbs./sq. in. for 30 minutes. After cooling the mold, the polymer-salt block is removed and treated with water until the salt is entirely leached out of the mass. The pressure under which the block is molded and the large amount of salt used causes the pores to be interconnecting due to the salt grains touching each other. This prevents the isolation of salt grains and facilitates the leaching out of the salt with water. The resulting spongy ethylene polymer after drying possesses an apparent density of 0.186 and is characterized by excellent resiliency and thermal insulating properties.

Any soluble product may be used in place of the sodium chloride in this example and the leaching process may be carried out using any corresponding suitable solvent.

Example IV

Ethylene polymer of average molecular weight about 20,000 is dispersed in water by the following procedure: 220 parts by weight of the polymer are milled with 20 parts of oleic acid and 10 parts of triethanolamine in a Banbury mixer at 95° C. until a uniform plastic product is obtained. Milling is continued and into this mass 84 parts by weight of a 5% solution of potassium hydroxide in water is slowly worked. This causes the mass to "break" to a cheese-like paste of extremely fine particles which is further mixed with water until a concentration of 60% polymer is produced. This dispersion is allowed to cream slightly and the upper portion containing 80% polymer, is used.

Five parts by weight of this 80% ethylene polymer dispersion are mixed with 6 parts of a 10% solution of polyvinyl alcohol in water and 6 parts of water. This mixture is treated with a high speed stirrer for about 10 minutes until a stable froth of about the consistency of whipped cream is produced. This froth is charged into a compression mold and heated at 160° C. for 5 minutes. This fuses the ethylene polymer in the froth into a spongy mass. After cooling, the spongy mass is removed from the mold and the polyvinyl alcohol and other water-soluble materials are removed by washing with water. The product is a soft, resilient sponge of apparent density about 0.32 and otherwise is similar to the spongy product produced in the foregoing examples.

In the preparation of spongy ethylene polymer by the general method described in Example I above, any material which is a gas at the temperature of extrusion may be used as a pore former. Thus, in addition to nitrogen, I may use air, carbon dioxide, and steam as well as the vapors of volatile organic solvents which are non-solvents for the polymer. Since in sponge prepared by this method the pore former used is largely retained in the finished product, carbon dioxide is of special use as a pore former due to its excellent thermal insulating properties.

Further control of the pore size in the sponge prepared by the extrusion of a froth may be obtained by passing the molten froth through a screen prior to extrusion. This causes the bubbles of the froth to be comminuted and finer pore sizes are obtained by using finer mesh screens.

Incorporation of the compressed gaseous pore former into the molten ethylene polymer may be carried out by methods other than by melting down a granular form of the polymer. Thus, compressed gases may be blown into a melt by the use of jets or they may be stirred into the melt by a suitable whipping operation, the highly viscous melt readily retaining bubbles produced therein by either of the above methods. Or the froth may be formed by the incorporation of a solid readily decomposable into gases as in Example II and the resulting froth extruded as in Example I.

The temperature at which the pore former is incorporated in the molten ethylene polymer may be any temperature above the melting point of the polymer used. To facilitate the preservation of the form of the froth by cooling, it is customary to use a temperature as close to the melting point as possible, preferably not more than 20° above the melting point.

There is practically no limit to the size of the spongy sheeting which may be prepared by extrusion. Thus, larger scale spongy sheeting 1" thick and 4' wide may be prepared by using extrusion apparatus of suitable size to produce the above dimensions in the finished product. This sheeting is excellent for thermally insulating the walls of dwellings and other buildings as well as refrigerators and the like.

Ethylene polymer sponge is form stable up to the temperature range of 95° to 100° C. and shows no tendency to become brittle down to −39° C. Thus, it is resilient and serviceable for handling over this wide range of temperatures. It may be sawed, sliced or otherwise cut into suitable shapes and may be drilled, nailed or bolted into position without cracking or undue distortion.

Useful ethylene polymer sponge ranges in apparent density from 0.50 to 0.01 since sponge of greater density than about 0.50 is too rigid and insufficiently porous to show distinct advantages of resiliency and insulating capacity over the unmodified polymer, and sponge of density less than about 0.01 is too porous to be form stable.

For porous ethylene polymer of a given density, variation in the pore size produces a corresponding variation in some of the physical properties of the material. Thus, a small pore size leads to increased form stability and improved thermal insulating properties whereas the porous polymer of similar density but larger pore size appears more resilient and slightly less efficient as a thermal insulating material. Thus the porosity of spongy material prepared according to this invention may be varied within wide limits to produce products of specific desired properties. Spongy sheeting of this invention having a reinforcing backing of a flexible material, paper, cloth, leather, metal foil, wire mesh, etc., is useful in a variety of applications, e. g., vibration cushions for motors, polishing cloths, anti-skid pads, etc.

This invention makes possible the preparation of a new form of ethylene polymer which is porous, resilient, form stable over a wide range of temperature and characterized by low density and excellent thermal insulating capacity.

In suitable form the products of this invention are useful for insulating the walls, floors, and ceilings of dwellings and other buildings, refrigerators, constant temperature rooms, hot water tanks, hot water pipes, containers for cold and hot foods and liquids, gloves for handling "dry ice" and other cold materials, light weight tropical hats, automobile and airplane bodies, and other places in which the higher of the two temperatures to be separated by a thermal insulator is not above about 95° to 100° C.

The new products claimed herein are also useful as sound insulators and in general acoustic control. Thus ethylene polymer sponge in the walls of automobile and airplane bodies serves not only to provide heat insulation but also to absorb the vibration of the motor. It is also useful in the sound insulation of radio studios, theaters, etc.

Spongy ethylene polymer in which the pores are not inter-connecting is highly useful as a float material for such uses as automatic tank level controls, life preservers, liners in non-sinkable boats, container closure gaskets, etc.

The rubbery resilience of spongy polymer makes it useful for a padding in seat cushions, pillows, mattresses, blankets, and mats to protect furniture during shipment, packing material to protect glass and other fragile objects, as a wadding material for shot gun shells, and similar uses.

This invention provides practical means for preparing ethylene polymer in a new spongy form characterized by much lower density and greatly improved thermal insulating capacity. This spongy form of polymer is serviceable in a wide variety of uses as described above, for which the solid polymer is not applicable.

A further advantage in the use of the products of this invention as thermal insulators over common cellulosic insulators is that they retain their excellent insulating properties indefinitely, not being at all affected by changes in humidity and, in the form in which the pores are not interconnecting, being impervious to the passage of water vapor. Thus, they do not deteriorate due to the accumulation of water as do commonly used cellulosic and "rock wool" insulating materials nor are they subject to attack by mold or other fungus growth, vermin, termites, etc.

This invention also provides means for preparing a spongy material of controlled density and rigidity making it possible to produce with ease products whose properties may be varied to suit the specific use for which they are intended.

As many apparently widely different embodiments of this invention may be made without departing from the spirit and scope thereof, it is to be understood that I do not limit myself to the specific embodiments thereof except as defined in the appended claims.

I claim:

1. An article of manufacture comprising a polymer of ethylene in porous spongy form, said polymer of ethylene corresponding in composition to $(CH_2)_x$ and showing by X-ray diffraction analysis a crystalline structure.

2. The article set forth in claim 1 in which the pores consist essentially of discrete non-interconnecting gas filled cells.

3. An article of manufacture comprising a polymer of ethylene in porous spongy form having an apparent density of from 0.50 to 0.01, said polymer of ethylene corresponding in composition to $(CH_2)_x$ and showing by X-ray diffraction analysis a crystalline structure.

FREDERICK L. JOHNSTON.

CERTIFICATE OF CORRECTION.

Patent No. 2,256,483. September 23, 1941.

FREDERICK L. JOHNSTON.

It is hereby certified that error appears in the printed specification of the above numbered patent requiring correction as follows: Page 1, second column, line 7, for "0.5%" read --0.05%--; and that the said Letters Patent should be read with this correction therein that the same may conform to the record of the case in the Patent Office.

Signed and sealed this 28th day of October, A. D. 1941.

(Seal)

Henry Van Arsdale,
Acting Commissioner of Patents.